US008374258B2

(12) United States Patent  
Yamasuge

(10) Patent No.: US 8,374,258 B2  
(45) Date of Patent: Feb. 12, 2013

(54) TRANSMISSION DEVICE, RECEPTION DEVICE, COMMUNICATION SYSTEM, TRANSMISSION METHOD AND PROGRAM

(75) Inventor: Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 1103 days.

(21) Appl. No.: 12/268,689

(22) Filed: Nov. 11, 2008

(65) Prior Publication Data

US 2009/0122838 A1 May 14, 2009

(30) Foreign Application Priority Data

Nov. 14, 2007 (JP) ................................. 2007-295730

(51) Int. Cl.  
*H04K 1/10* (2006.01)
(52) U.S. Cl. ..................... 375/260; 375/133; 375/132
(58) Field of Classification Search .................. 375/133, 375/259, 260, 132; 370/69.1, 206; 455/59, 455/69; 714/48  
See application file for complete search history.

(56) References Cited

U.S. PATENT DOCUMENTS

| | | | | |
|---|---|---|---|---|
| 5,852,630 A * | 12/1998 | Langberg et al. | ............. | 375/219 |
| 7,512,185 B2 * | 3/2009 | Sharon et al. | ................. | 375/260 |
| 2004/0151109 A1 * | 8/2004 | Batra et al. | ..................... | 370/208 |
| 2004/0199846 A1 * | 10/2004 | Matsumoto et al. | .......... | 714/748 |
| 2005/0190817 A1 * | 9/2005 | Batra et al. | ..................... | 375/130 |
| 2005/0226348 A1 | 10/2005 | Jurgensen et al. | | |
| 2005/0239488 A1 * | 10/2005 | Ebiko | ........................... | 455/522 |
| 2005/0243843 A1 * | 11/2005 | Imamura et al. | ............... | 370/401 |
| 2006/0023802 A1 * | 2/2006 | Balakrishnan et al. | ........ | 375/265 |
| 2006/0072524 A1 * | 4/2006 | Perahia et al. | ................. | 370/338 |
| 2007/0159996 A1 * | 7/2007 | Park et al. | ....................... | 370/328 |
| 2007/0213014 A1 * | 9/2007 | Meacham et al. | .............. | 455/69 |
| 2007/0230594 A1 * | 10/2007 | Mo et al. | ......................... | 375/260 |
| 2011/0129032 A1 * | 6/2011 | Batra et al. | ..................... | 375/298 |

FOREIGN PATENT DOCUMENTS

| | | |
|---|---|---|
| JP | 05-075559 | 3/1993 |
| JP | 2005-304029 | 10/2005 |
| JP | 2006-197375 | 7/2006 |
| JP | 2006-211035 | 8/2006 |
| JP | 2007-214992 | 8/2007 |
| JP | 2007-243236 | 9/2007 |

* cited by examiner

*Primary Examiner* — Shuwang Liu  
*Assistant Examiner* — Helene Tayong  
(74) *Attorney, Agent, or Firm* — Finnegan, Henderson, Farabow, Garrett & Dunner, LLP

(57) ABSTRACT

A transmission device of the present invention includes a MAC that generates data I transmitted by a band group M and generates data J transmitted by a band group N; signal switching parts that exchange a part of the data I and a part of the data J; and antennas that simultaneously transmit the data I and the data J after data exchange is performed by the signal switching parts, by the band group M and the band group N.

8 Claims, 17 Drawing Sheets

| a | b | c | d | e | f | g | h |

| a | e | b | f | c | g | d | h |

TRANSMISSION DEVICE, RECEPTION DEVICE, COMMUNICATION SYSTEM, TRANSMISSION METHOD AND PROGRAM

CROSS REFERENCES TO RELATED APPLICATIONS

The present invention contains subject matter related to Japanese Patent Application JP 2007-295730 filed in the Japan Patent Office on Nov. 14, 2007, the entire contents of which being incorporated herein by reference.

BACKGROUND OF THE INVENTION

1. Field of the Invention

The present invention relates to a transmission device, a reception device, a communication system, a transmission method and a program.

2. Description of the Related Art

In recent years, in a field of a wireless communication, a system of performing wireless communication in a remarkably wide frequency band called Ultra Wideband (UWB) has been developed. Under such a circumstance, a multiband OFDM (orthogonal frequency division multiplexing) system developed by an industry group called WiMedia has been recently a majority. According to the WiMedia, division of a UWB frequency band is performed by a frequency unit of about 1.5 GHz called a band group (BG; Band group).

FIG. 17 shows band groups defined by the WiMedia. In these band groups, a band group #1 is allocated to a low band, and band groups #3, #4, #5, #6 are allocated to a high band. The band group #5 of the band groups of the high band is supposed to be used only for a particular purpose of use, because the frequency is high and only 1 GHz is allocated to this band group.

As shown in FIG. 17, each one of the band groups #3, #4, #6 of the high band is further divided into three sub-bands of 528 GHz bands, and the specification of the WiMedia defines that fast hopping is performed to these three sub-bands.

[Patent Document 1] Japanese Patent Application Laid-Open No. 2007-214992
[Patent Document 2] Japanese Patent Application Laid-Open No. 2006-197375
[Patent Document 3] Japanese Patent Application Laid-Open No. 2006-211035
[Patent Document 4] Japanese Patent Application Laid-Open No. 2005-304029

SUMMARY OF THE INVENTION

However, even when the communication is performed, for example, by a specific band group based on the specification of the WiMedia, it can be considered that the necessity for performing large volume communication is generated. In this case, it may be difficult to tremendously increase communication amount by the communication of a single band group.

In addition, in the communication in each band group, a communication state is changed according to a state of a communication channel. Under such a circumstance, it may be difficult to secure better channels in all of a plurality of band groups, even in a case in which the communication is performed by using a plurality of band groups, and reception characteristics would be eccentrically-located in any one of the channels. In this case, there is an issue that better communication can hardly be performed in the band group with lowered channel characteristics.

Therefore, the present invention has been made in view of the above-described issue, and it is desirable to provide new and improved transmission device, reception device, communication system, transmission method and program capable of tremendously increasing a communication volume with a simple structure, and capable of improving fading resistance.

According to an embodiment of the present invention, there is provided a transmission device, including: a first data generation part that generates first data transmitted in a first frequency band; a second data generation part that generates second data transmitted in a second frequency band; a data exchange part that exchanges a part of the first data and a part of the second data; and a transmission part that transmits the first and second data after data exchange is performed by the data exchange part, in each one of the first and second frequency bands.

According to the above-described structure, the first data transmitted in the first frequency band is generated, and the second data transmitted in the second frequency band is generated, and a part of the first data and a part of the second data are exchanged. Then, the first and second data after data exchange is performed are transmitted in each one of the first and second frequency bands. Accordingly, the first and second data can be spread over two frequency bands, and even when the channel characteristic of one of the band groups is deteriorated, the data spread over both band groups can be surely decoded. Thus, reception characteristics in total can be improved.

In addition, the data exchange part may exchange the first and second data subjected to the processing of spread along frequency axis, spread along time axis, or DCM modulation, per every ½ symbol. According to such a structure, the first and second data spread along frequency axis and time axis or subjected to DCM modulation can be efficiently spread over the first and second frequency bands.

In addition, it may be also preferable that an inverse Fourier transform part that applies inverse Fourier transform to the first and second data is provided, and the data exchange part exchanges the data to which the inverse Fourier transform is applied by the inverse Fourier transform part, per every one symbol. According to this structure, the data, to which the inverse Fourier transform is applied, is exchanged per every one symbol. Therefore, data exchange can be performed with a simple structure.

In addition, it may be also preferable that the transmission part includes a DA converter that DA-converts the data after data exchange is performed by the data exchange part; an RF circuit that amplifies a signal converted by the DA converter; and a transmission antenna that transmits the signal output from the RF circuit, wherein at least one of the DA converter, the RF circuit, and the transmission antenna functions to process the first and second data transmitted in both of the first and second frequency bands. According to this structure, at least one of the DA converter, the RF circuit and the transmission antenna functions to process both of the first and second data transmitted in both of the first and second frequency bands. This makes it possible to make the device simple.

In addition, it may be also preferable that a controlling part that obtains count values of the first and second data is provided, and the controlling part controls the exchange of the data by the data exchange part based on the count values of the first and second data. According to this structure, based on the count values of the first and second data, the exchange of the data by the data exchange part is limited. This makes it possible to realize the data exchange with high accuracy.

In addition, it may be also preferable that in each one of the first frequency band and the second frequency band, the first and second data are transmitted without performing frequency hopping. According to this structure, the first and second data can be transmitted without performing frequency hopping. This makes it possible to make the first and second frequency bands close to each other. Thus, the RF circuit or the like can be made simple, and simplification of the device and reduction of a manufacturing cost can be realized.

According to another embodiment of the present invention, there is provided a first reception part that receives a first transmission signal transmitted in a first frequency band; a second reception part that receives a second transmission signal transmitted in a second frequency band, with a part of data mutually spread between the first transmission signal and the second transmission signal; and a data exchange part that exchanges a part of the first transmission signal and a part of the second transmission signal.

According to the above-described structure, the first transmission signal transmitted in the first frequency band is received from the transmission device, and the second transmission signal transmitted in the second frequency band, with a part of the data spread between the first transmission signal and the second transmission signal, is received, and a part of the first transmission signal and a part of the second transmission signal are exchanged. Accordingly, by exchanging a part of the first and second transmission signals spread over two frequency bands, the data exchanged at the transmission device side can be recovered at the reception device side.

According to another embodiment of the present invention, there is provided a communication system in which the transmission device and the reception device are connected to each other via a wireless communication network, the transmission device including a first data generation part that generates first data transmitted in a first frequency band; a second data generation part that generates second data transmitted in a second frequency band; a transmission side data exchange part that exchanges a part of the first data and a part of the second data; and a transmission part that transmits the first and second data after data exchange is performed by the data exchange part, in each one of the first and second frequency bands, and the reception device including a first reception part that receives a first transmission signal transmitted in the first frequency band; a second reception part that receives the second transmission signal transmitted in the second frequency band, with a part of the data mutually spread between the first transmission signal and the second transmission signal; and a reception side data exchange part that exchanges a part of the first transmission signal and a part of the second transmission signal.

According to the above-describe structure, in the transmission device, the first data transmitted in the first frequency band is generated, and the second data transmitted in the second frequency band is generated, and a part of the first data and a part of the second data are exchanged. Then, the first and second data, after data exchange is performed, are transmitted in each one of the first and second frequency bands. Also, in the reception device, the first transmission signal transmitted from the transmission device in the first frequency band is received, the second transmission signal transmitted in the second frequency band, with a part of the data mutually spread between the first transmission signal and the second transmission signal, is received, and a part of the first transmission signal and a part of the second transmission signal are exchanged. Accordingly, the data is exchanged at the transmission device side, and the data is recovered at the reception device side, thereby making it possible to surely decode the data transmitted in both band groups based on the data transmitted over the two band groups.

According to another embodiment of the present invention, there is provided a transmission method including the steps of: generating first data transmitted in a first frequency; generating second data transmitted in a second frequency band; exchanging a part of the first data and a part of the second data; and transmitting the first and second data, after data exchange is performed in each one of the first and second frequency bands respectively.

According to the above-described structure, the first data transmitted in the first frequency is generated, the second data transmitted in the second frequency is generated, and a part of the first data and a part of the second data are exchanged. Then, the first and second data, after the data exchange is performed, are transmitted in each one of the first and second frequency bands. Accordingly, the first and second data can be spread over the two frequency bands, and even when the channel characteristic of one of the band groups is deteriorated, the data spread over both band groups can be surely decoded. Thus, the reception characteristics in total can be improved.

According to another embodiment of the present invention, there is provided a program for making a computer function as: a section that generates first data transmitted in a first frequency band; a section that generates second data transmitted in a second frequency band; a section that exchanges a part of the first data and a part of the second data; and a section that transmits the first and second data after data exchange is performed by the data exchange section, in each one of the first and second frequency bands.

According to the above-described structure, the first data transmitted in the first frequency band is generated, the second data transmitted in the second frequency band is generated, and a part of the first data and a part of the second data are exchanged. Then, the first and second data after data exchange is performed, are transmitted in each one of the first and second frequency bands. Accordingly, the first and second data can be spread over the two frequency bands, and even when the channel characteristics of one of the band groups is deteriorated, the data spread over the both band groups can be surely decoded. Thus, the reception characteristics in total can be improved.

According to the present invention, it may be possible to provide the transmission device, the reception device, the communication system, the transmission method and the program capable of tremendously increasing the communication volume with a simple structure, and capable of improving the fading resistance.

DETAILED DESCRIPTION OF THE PREFERRED EMBODIMENTS

Figure 1:
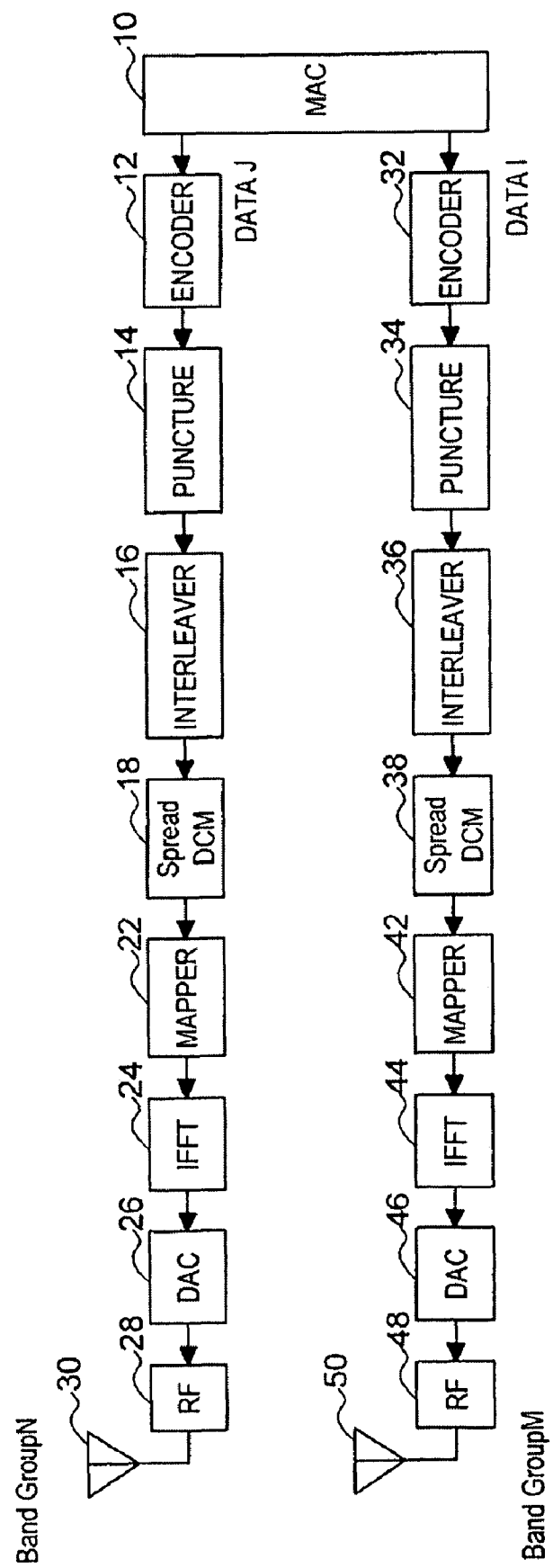
FIG. 1 is a schematic view showing a transmission device of a multiband OFDM system of UWB capable of transmitting data by two band groups according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, as a prestage of explaining the configuration of the present invention, description will be given for the configuration of a transmission device of a multiband OFDM system of UWB capable of transmitting data by two band groups according to this embodiment based on FIG. 1.

As shown in FIG. 1, the transmission device includes a MAC 10 that outputs transmitted data. Also, in order to transmit data J by band group N, a transmission device 100 includes an encoder 12, a puncture 14, an interleaver 16, a spread/DCM modulation part 18, a mapper 22, an IFFT 24, a DA converter (DAC) 26, an RF circuit 28, and an antenna 30. Also, in order to transmit data I by band group M, the transmission device 100 includes an encoder 32, a puncture 34, an interleaver 36, a spread/DCM modulation part 38, a mapper 42, an IFFT 44, a DA converter 46, an RF circuit 48, and an antenna 50.

Figure 2:
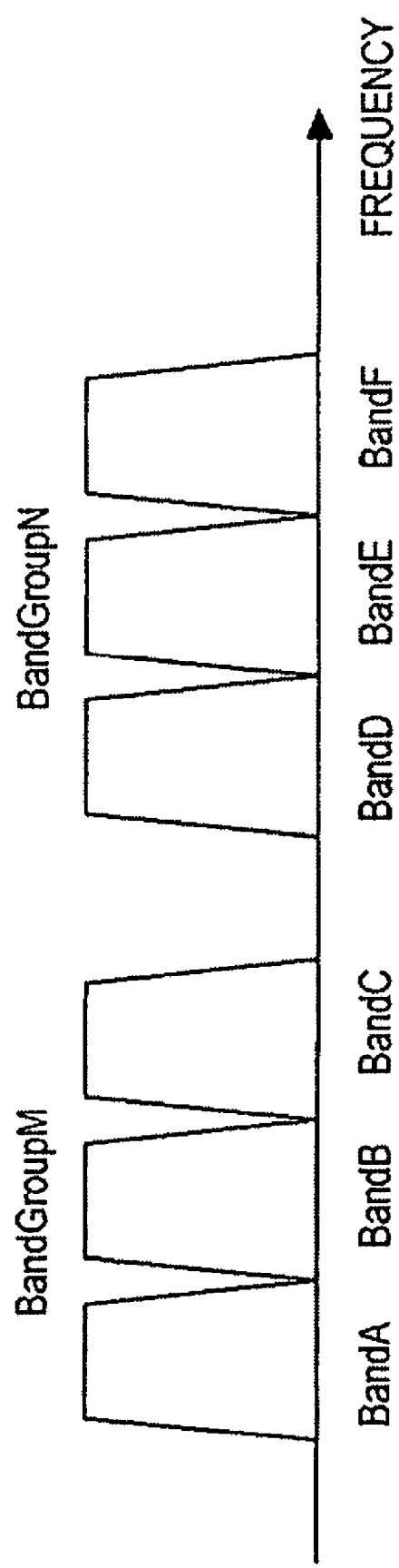
FIG. 2 is a schematic view showing an example of two band groups M and N used in the transmission device of FIG. 1.
Figure 17:
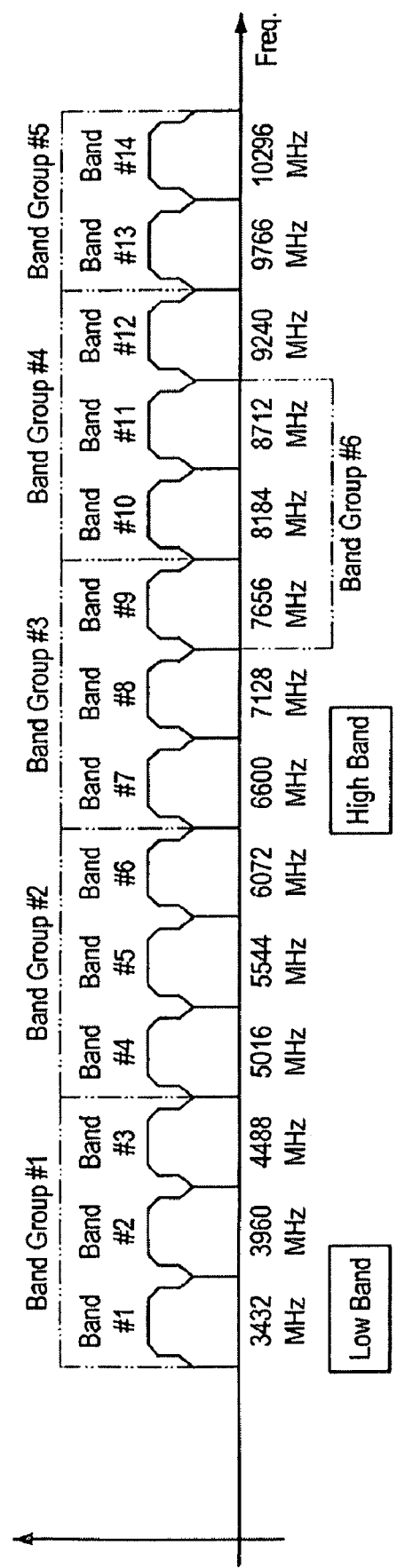
FIG. 17 is a schematic view showing the band group defined by WiMedia.

Data J transmitted by band group N is transmitted to the encoder 12 from the MAC 10, and data I transmitted by band group M is transmitted to the encoder 32. FIG. 2 is a schematic view showing an example of two band groups M and N used by the transmission device of FIG. 1. For example, two of the band groups shown in FIG. 17 can be set as the band groups of FIG. 2. As shown in FIG. 2, the band group M is configured of three bands such as band A, band B, and band C. Also, the band group N is configured of three bands such as band D, band E, and band F. In the transmission by each band group M and N, frequency hopping is performed by three bands of each band group.

Encoders 12 and 32 encode the transmitted data. Punctures 214 and 34 perform puncture processing to the data encoded by encoders 28 and 48. The interleavers 16 and 36 interleave the punctured data. The spread/DCM modulation parts 18 and 38 make interleaved data spread along frequency axis, and perform DCM modulation thereto, then send it to mappers 22 and 42.

The mappers 22 and 42 perform frequency mapping for performing hopping according to a hopping pattern. Signals output from the mappers 22 and 42 are subjected to inverse Fourier transform by IFFT 24 and 44 and converted to analogue signals in the DA converters 26 and 46. The signals converted to the analogue signals in the DA converters 26 and 46 are sent to the RF circuits 28 and 48, and transmitted from the antennas 30 and 50.

Figure 3:
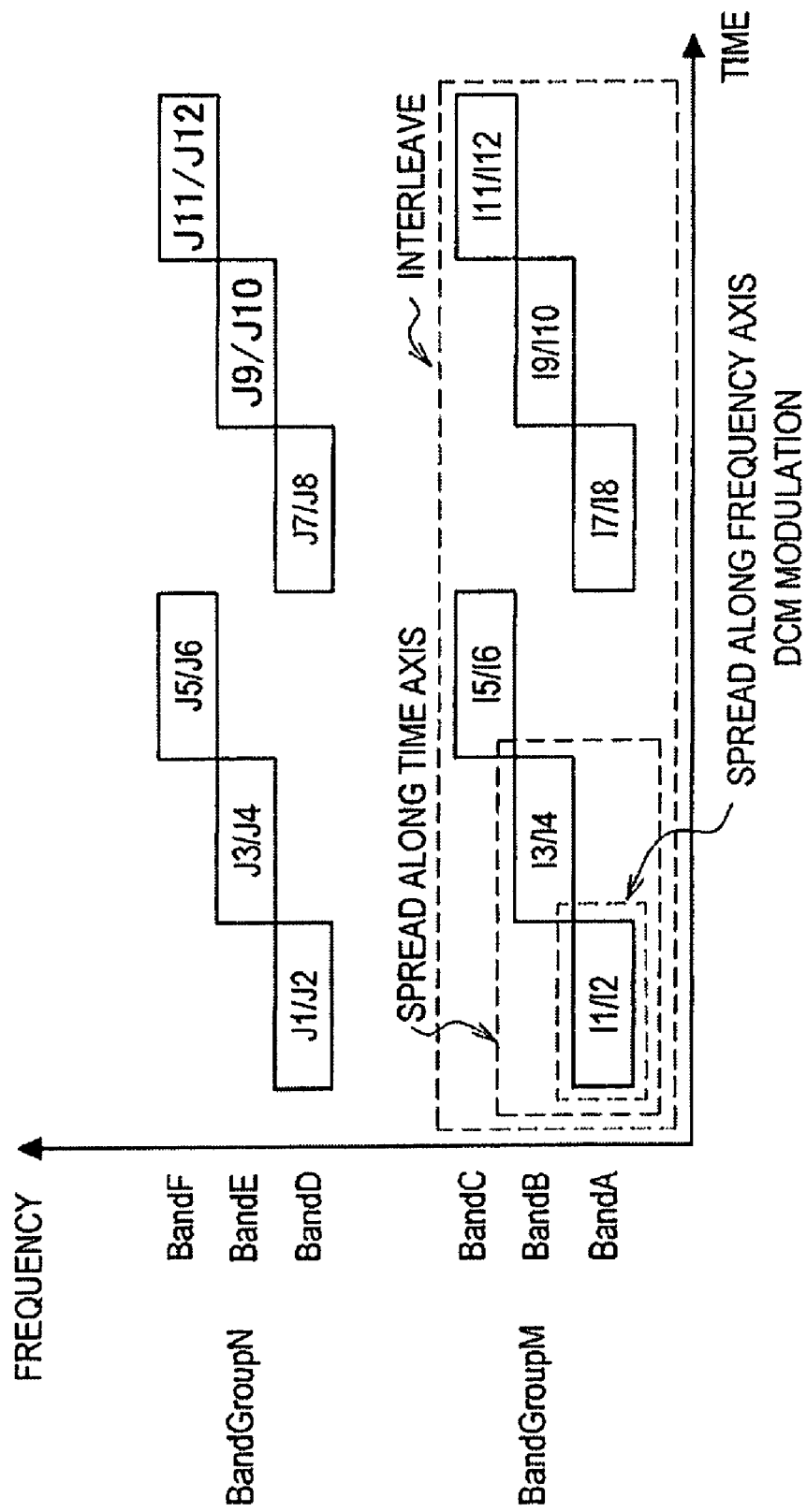
FIG. 3 is a schematic view showing a state in which communication is performed by using two band groups M and N.

FIG. 3 is a schematic view showing a state in which the communication is performed by using two band groups M and N simultaneously. As shown in FIG. 3, the hopping is performed by three bands of the band A, band B, and band C in the band group M. Also, the hopping is performed by three bands of the band D, band E, and band F in the band group N. The processing of interleave, spread along frequency axis, DCM modulation, and spread along time axis are applied to the signals sent by each one of the band groups M and N.

As described above, according to the transmission device shown in FIG. 1, the transmission by the band group M and the band group N can be simultaneously performed. Therefore, the communication volume per unit time can be significantly increased compared to a case in which the transmission is performed by one band group. Note that according to this embodiment, an example is shown as the case in which the communication is performed by using the two band groups M and N simultaneously. However, the communication may be performed by simultaneously using three or more band groups with different bands. Thus, further increase of the communication volume can be achieved.

Incidentally, when the communication is performed by using a plurality of band groups, it can be so assumed that a communication state by a part of the band groups is deteriorated compared to the communication state of other band groups. For example, when channels only in band group M is favorable out of two band groups M and N shown in FIG. 3, unevenness is generated in the reception characteristics between the two band groups M and N. In this case, the communication by the band group M is mainly performed, and a merit of using two band groups can hardly be obtained.

Therefore, according to this embodiment, a part of transmission data is exchanged between the band group M and the band group N. At this time, the communication data can be straddled two band groups efficiently by exchanging the signals subjected to processing of spread along frequency axis, spread along time axis, DCM modulation, and interleave between band groups.

Figure 4:
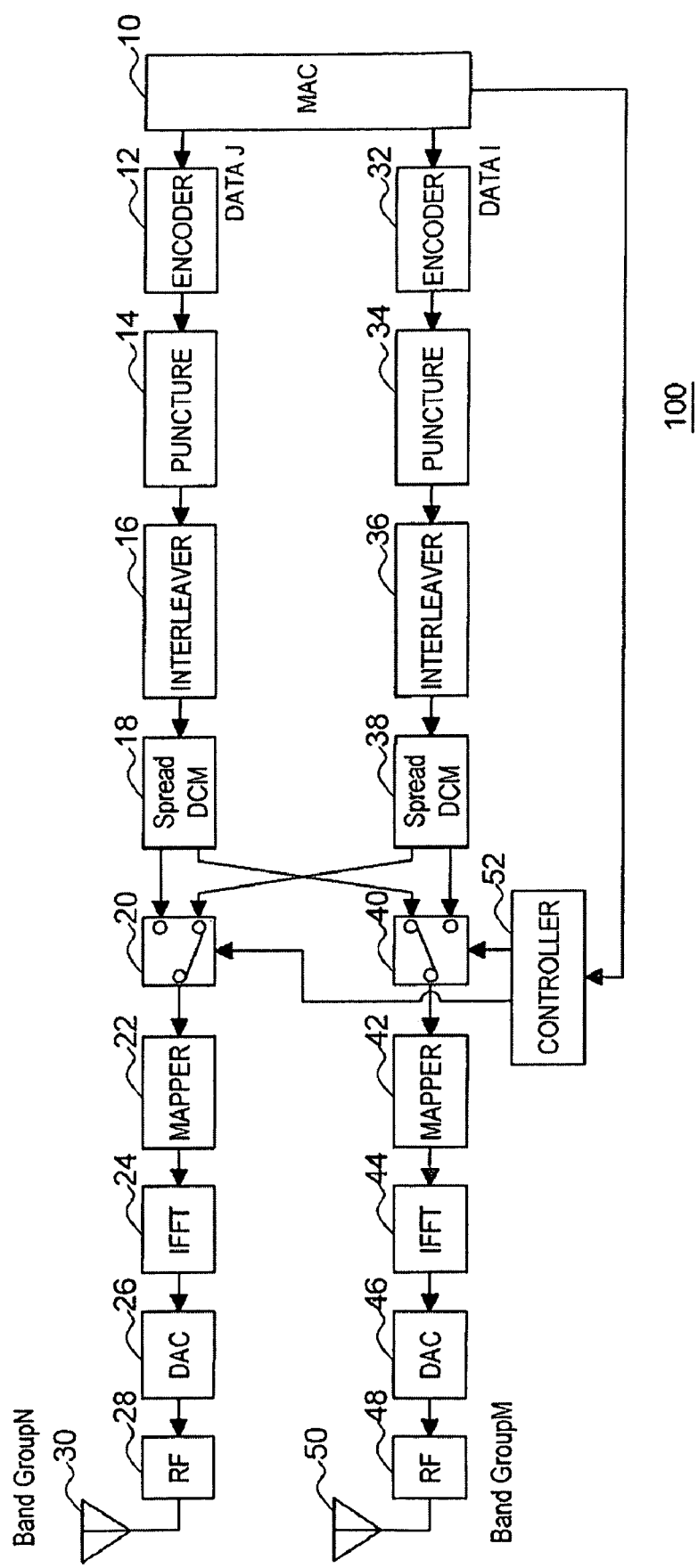
FIG. 4 is a schematic view showing a specific configuration example of the transmission device according to another embodiment of the present invention.

FIG. 4 is a schematic view showing the structure of the transmission device 100 according to this embodiment. The transmission device 100 shown in FIG. 4 is formed by adding a signal switching part 20, a signal switching part 40, and a controller 52 to the transmission device of FIG. 1. The signal switching part 20 is provided between the spread/DCM modulation part 18 and the mapper 22. Both of the data J sent from the spread/DCM modulation part 18 and the data I sent from the spread/DCM modulation part 38 are input in the signal switching part 20. The signal switching part 20 sends either one of the data I and the data J to the mapper 22.

In addition, the signal switching part 40 is provided between the spread/DCM modulation part 38 and the mapper 42. Both of the data J sent from the spread/DCM modulation part 18 and the data I sent from the spread/DCM modulation part 38 are input in the signal switching part 40. The signal switching part 40 sends either one of the data I and the data J to the mapper 42.

The controller 52 controls switching of the transmission data by the signal switching parts 20 and 40 based on count values of the transmission data transmitted from MAC 60. At this time, the controller 52 controls operations of the signal switching parts 20 and 40 so as to send the data J to the mapper 22 when the data I is sent to the mapper 42, and send the data J to the mapper 42 when the data I is sent to the mapper 22. Thus, the data I supposed to be transmitted by the band group M can be transmitted by the band group N, and the data J supposed to be transmitted by the band group N can be transmitted to the band group M. Accordingly, the transmission data I and J can be exchanged between the two band groups M and N. Note that the program (software), whereby the MAC 10 and the controller 52 having the above-described structure is functioned, can be stored in a predetermined memory of the transmission device 100 or an external recording medium.

Figure 5:
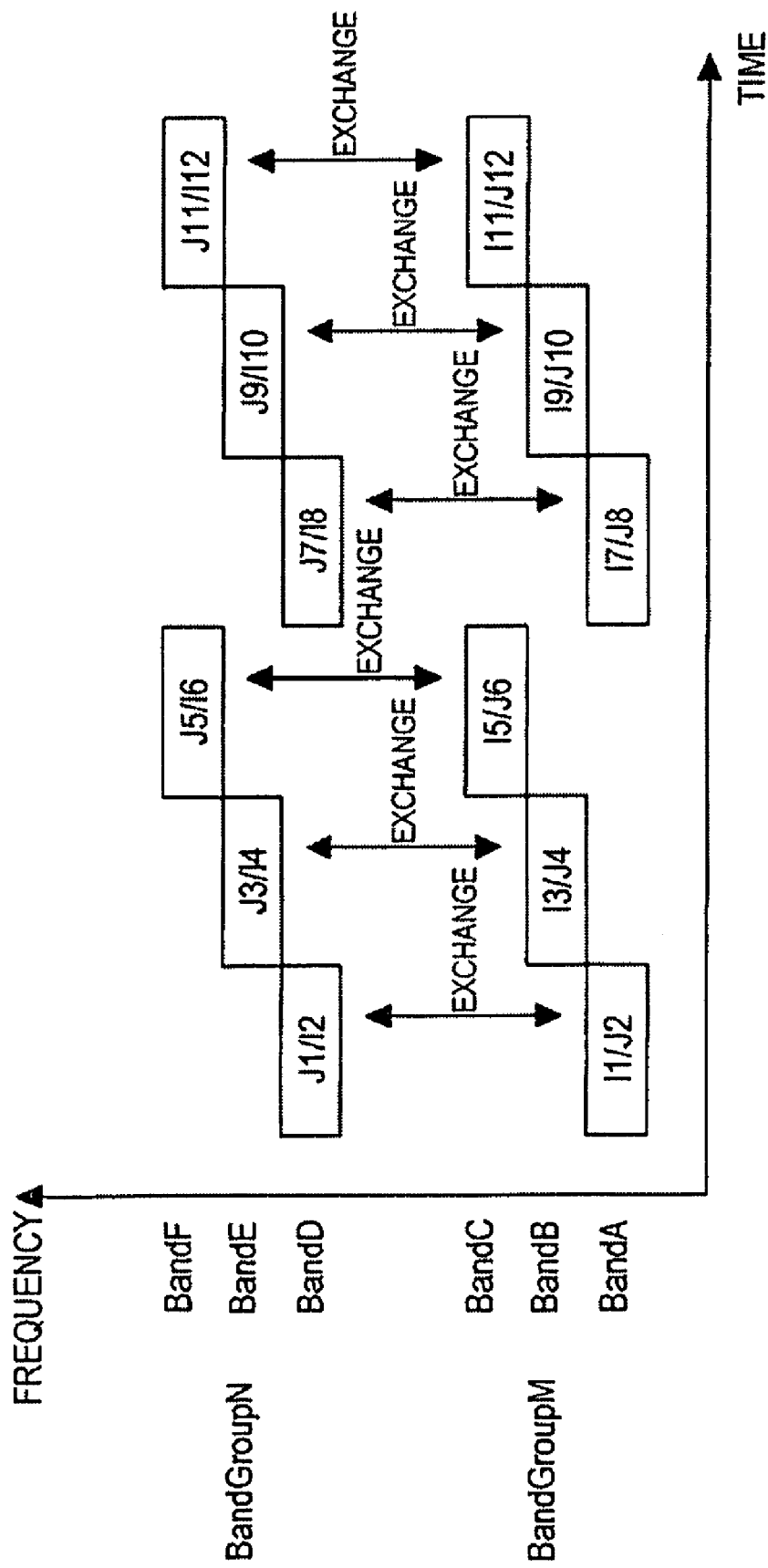
FIG. 5 is a schematic view showing a state in which data is exchanged between two band groups.

FIG. 5 is a schematic view showing a state in which the data is exchanged between two band groups. In an example of FIG. 5, a signal I2 of the band group M is exchanged with a signal J2 of the band group N. Also, a signal I4 of the band group M is exchanged with a signal J4 of the band group N, and a signal I6 of the band group M is exchanged with a signal J6 of the band group N. In this embodiment, the exchange of these signals is performed per every data group of ½ of the symbol obtained by the spread along frequency axis.

Thus, by exchanging the data between band groups, information is spread between two band groups. Then, by exchanging the signals subjected to processing of the spread along frequency axis, the spread along time axis, the DCM modulation, and the interleave between band groups, difference in the reception characteristics between the data I and the data J can be eliminated irrespective of the difference of channels between the band groups. Then, by recovering the data exchanged between the band groups at the reception device side, the data transmitted by both band groups can be surely decoded based on the data transmitted over two band groups. Accordingly, even when the channel characteristics of either one of the band groups are deteriorated, the reception characteristics in total can be improved, thereby achieving a fading-resistant structure.

FIG. 6 is a schematic view showing a state in which processing such as interleave and frequency spread are applied to the data I transmitted by the band group M. Here, the data composed of 8 sub-carriers arranged in an order of a, b, c, d, e, f, g, h is transmitted.

Figures 6A, 6B, 6C:
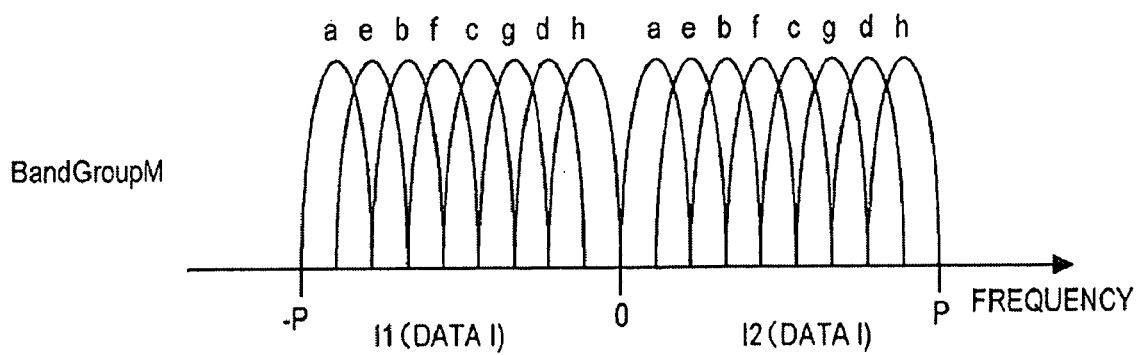
FIGS. 6A, 6B, 6C are schematic view showing a state in which interleave and frequency spread are performed for data I transmitted by band group M.
Figure 8:
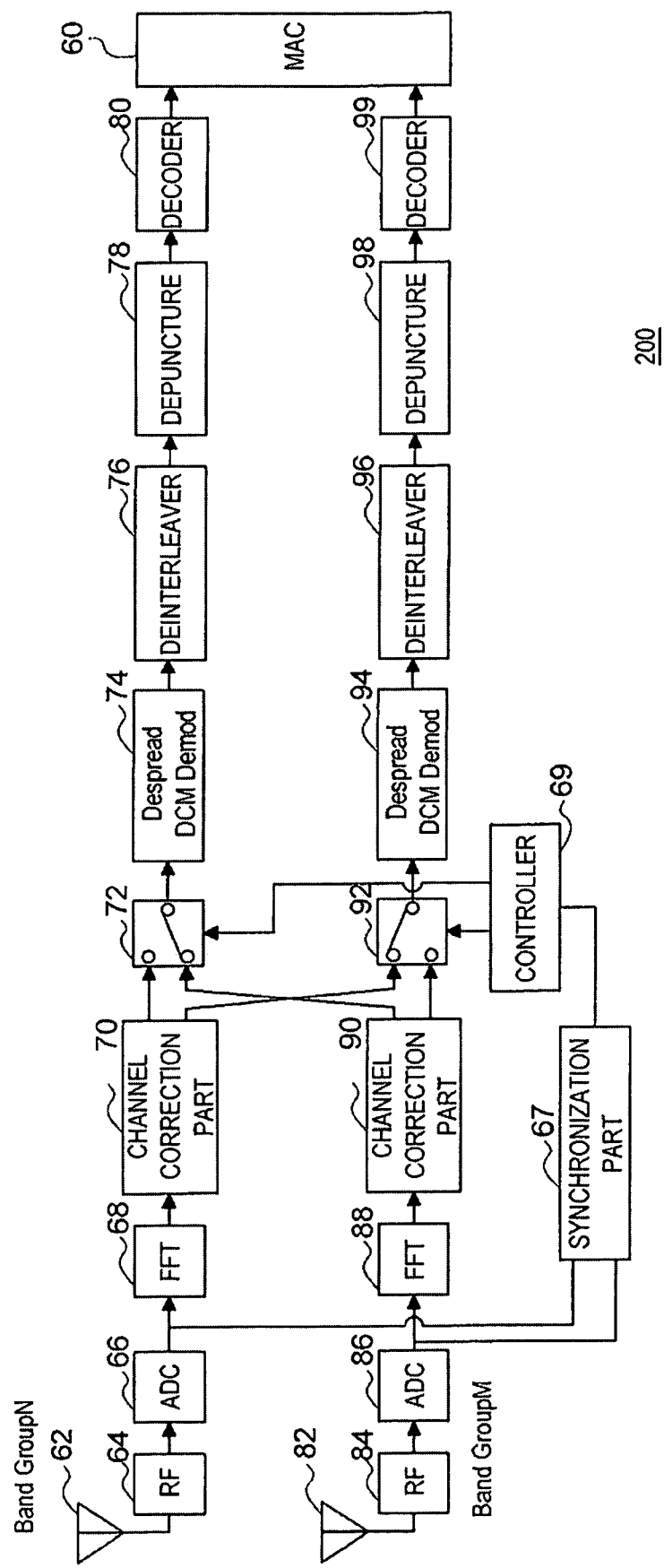
FIG. 8 is a schematic view showing a configuration of a reception device that receives a signal transmitted by the transmission device of FIG. 4.

8 sub-carriers (a, b, c, d, e, f, g, h) shown in FIG. 6A are transmitted from the MAC 10, which are then encoded by an encoder 12, and punctured by the puncture 14. As shown in FIG. 6B, 8 sub-carriers shown in FIG. 6A are rearranged in an order of a, e, b, f, c, g, d, h by the interleaver 36. FIG. 6C shows a state in which 8 interleaved sub-carriers (a, e, b, f, c, g, d, h) are spread along frequency axis around a transmission frequency. In FIG. 6C, the left side 8 sub-carriers (a, e, b, f, c, g, d, h) correspond to I1 of FIG. 3. Also, the right side 8 sub-carriers (a, e, b, f, c, g, d, h) correspond to I2 of FIG. 3. Data I1/I2 obtained by the spread along frequency axis is set as the data of one symbol (OFDM data of one unit), and the frequency hopping is performed to every data of this one symbol. In addition, in IFFT 24 and 44, modulation is performed to every data of one symbol.

The data shown in FIG. 6C is set as the same data for every two continuous symbols by the spread along time axis. Accordingly, in FIG. 3, I1/I2 and I3/I4 are the same data. Similarly, I5/I6 and I7/I8 are the same data, and I9/I10 and I11/I12 are the same data. It is determined in this embodiment, that which one of the spread along frequency axis, the spread along time axis, and the DCM modulation is performed according to 8 transmission rates. When the transmission rates are relatively low (53 Mbps, 80 Mbps), both of the spread along frequency axis and the spread along time axis are performed. FIG. 3 and FIG. 5 show a case of performing both of the spread along frequency axis and the spread along time axis. Meanwhile, when the transmission rates are middle level (106 Mbps, 160 Mbps, 200 Mbps), only the spread along time axis is performed. In addition, when the transmission rates are relatively high (320 Mbps, 400 Mbps, 480 Mbps), only the DCM modulation (Dual Carrier Modulation) is performed. In any case, data exchange is performed for every ½ symbol in this embodiment.

Figure 7:
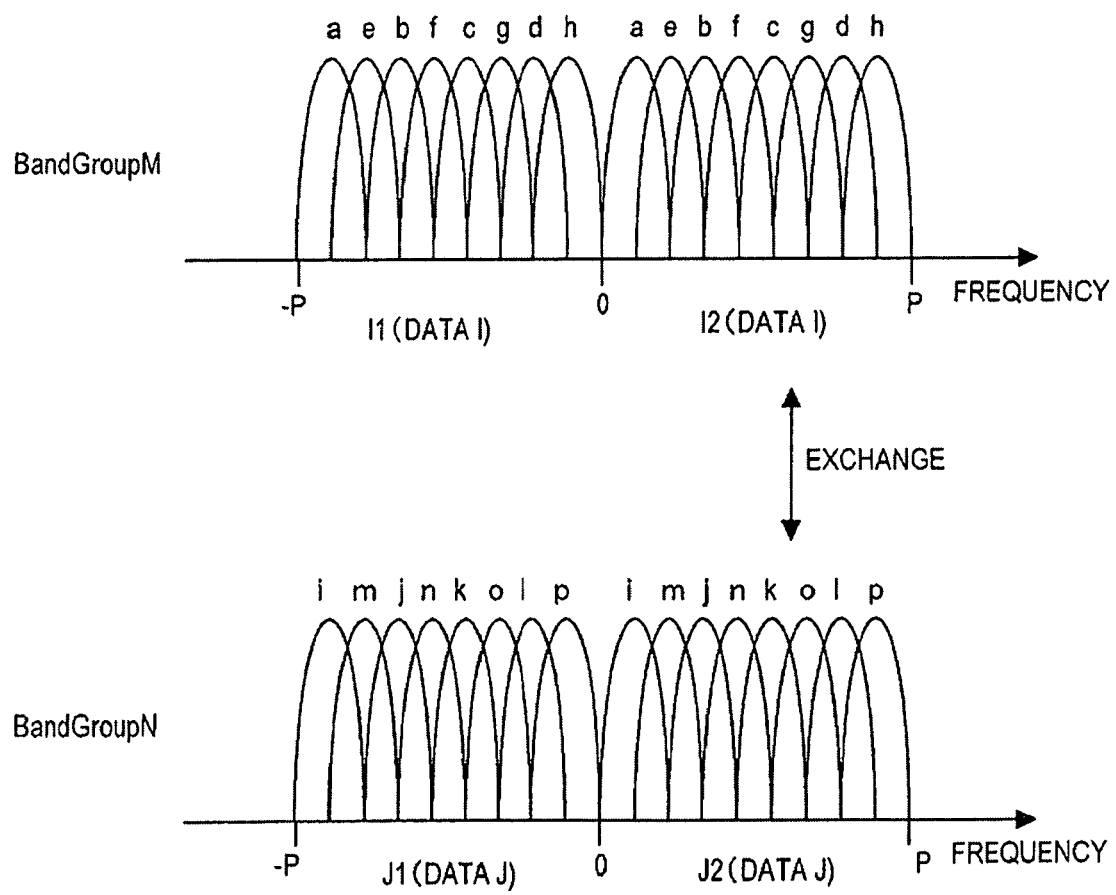
FIG. 7 is a schematic view showing a state in which data spread along frequency axis is exchanged.

In the same way as the data I, data J transmitted by the band group N is also subjected to the processing of interleave, spread along frequency axis, spread along time axis, and DCM modulation. 8 sub-carriers (i, j, k, l, m, n, o p) transmitted from the MAC 10, and processed by the encoder 12 and the puncture 16 are rearranged in an order of i, m, j, n, k, o, l, p by the interleaver 16. The data shown in a lower stage of FIG. 7 shows a state in which the 8 data thus rearranged are spread along frequency axis around the transmission frequency in the same way as FIG. 6C. In the data shown in the lower stage of FIG. 7, the left side 8 sub-carriers (i, m, j, n, k, o, l, p) correspond to J1 of FIG. 3. Also, the right side 8 sub-carriers (i, m, j, n, k, o, l, p) correspond to J2 of FIG. 3. Also, the data shown in an upper stage of FIG. 7 shows the same data I1/I2 as the data of FIG. 6C.

As shown in FIG. 7, any one of the data spread along frequency axis on the side of frequency lower or higher than the central frequency is exchanged between band groups. In an example of FIG. 7, data I2 and data J2 are exchanged. Exchange of the data is performed at the time of frequency mapping. Regarding other data I and J also, the exchange of the data is performed per every ½ of one symbol obtained by the spread along frequency axis. Thus, the data transmitted by the band group M and the data transmitted by the band group N can be mutually spread, and data transmission resistant to fading can be performed when the transmission is performed by two band groups. In addition, by exchanging the data per every ½ unit of one symbol obtained by the spread along frequency axis, the signals are spread between band groups, after being subjected to the processing of interleave, spread along frequency axis, DCM modulation, and spread along time axis. Accordingly, the exchange of the data can be most efficiently performed with a simple structure.

The controller 52 controls switching of the signals by signal switching units 20 and 40 based on the count values of transmitted data. Accordingly, by controlling the signal switching units 20 and 40 based on the count values of the transmitted sub-carriers, the data exchange of the data I and data J can be realized between band groups as described above.

As described above, according to this embodiment, by exchanging the transmitted data I and J between band groups after spread processing and DCM modulation processing, frequency axis spread signals, time axis spread signals, DCM modulated signals, and interleave can be spread over the band groups.

Note that in addition to the example shown in FIG. 4, various examples can be considered for the exchange of the data between band groups. For example, the data may be exchanged one by one in the unit of sub-carrier, or only I signal or Q signal may be exchanged.

FIG. 8 is a schematic view showing a structure of a reception device 200 that receives the signal transmitted by a transmission device 100 of FIG. 4. The transmission device 100 and the reception device 200 are communicatively connected by a wireless communication network. As shown in FIG. 8, the reception device 200 includes an antenna 62, an RF circuit 64, an AD converter (ADC) 66, an FFT 68, and a channel correction part 70 for receiving the signal transmitted by the band group N. Also, the reception device 200 includes an antenna 82, an RF circuit 84, an AD converter (ADC) 86, an FFT 88, and a channel correction part 90 for receiving the data transmitted by the band group M. In addition, the reception device 200 includes signal switching parts 72 and 92, despread/DCM demodulation parts 74 and 94, deinterlevers 76 and 96, depunctures 78 and 98, decoders 80 and 99, and MAC 60.

In FIG. 8, high frequency signals received by antennas 62 and 82 are amplified by RF circuits 64 and 84, and converted to digital signals by AD converters 66 and 86. The received signals converted to the digital signals are subjected to fast Fourier transform by FFTs 68 and 88 and sent to channel correction parts 70 and 90. The channel correction parts 70 and 90 perform processing of correcting channels based on a channel estimation signal (CE) included in the received signals.

The signals corrected by the channel correction parts 70 and 90 are sent to the signal switching parts 72 and 92. Both of the data sent from the channel correction part 70 and the data sent from the channel correction part 90 are input in the signal switching part 72. Also, both of the data sent from the channel correction part 70 and the data sent from the channel correction part 90 are input in the signal switching part 92.

The despread DCM demodulation parts 74 and 94 apply processing of despread along frequency axis and DCM demodulation to the signals input from the signal switching parts 72 and 92. Deinterleavers 76 and 96 perform processing of recovering the received signals subjected to interleave. The received signals output from the deinterleavers 76 and 96 are sent to the depunctures 78 and 98, and the processing of depuncture is applied thereto. The decoders 80 and 99 decode the signals input from the depunctures 78 and 98. The signals decoded by the decoders 80 and 99 are input to the MAC 60.

A synchronization circuit 67 acquires synchronization of the signals received by the AD converters 66 and 86. The controller 69 counts the number of sub-carriers for the signals synchronized in the synchronization circuit 67, and based on this number, controls the signal switching part 72 and the signal switching part 92. Thus, regarding the received signals, by controlling the signal switching parts 72 and 92 according to the number of sub-carriers, the reception device 200 can perform data exchange opposite to the data exchange shown in FIG. 5. Accordingly, the received data can be recovered to a state before the data exchange is performed in signal switching parts 18 and 38 of the transmission device 100.

Figure 9:
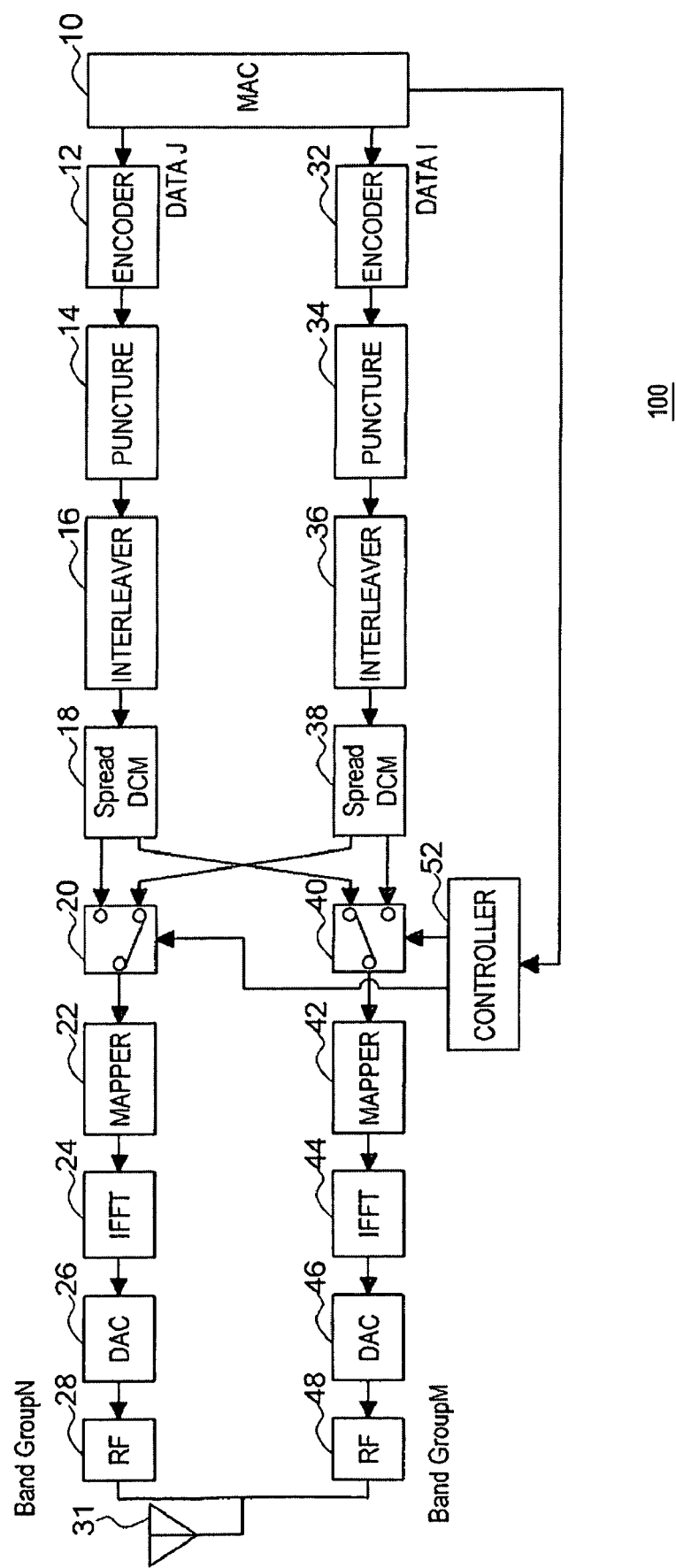
FIG. 9 is a schematic view showing an example of providing an antenna commonly used in the band groups M and N.
Figure 10:
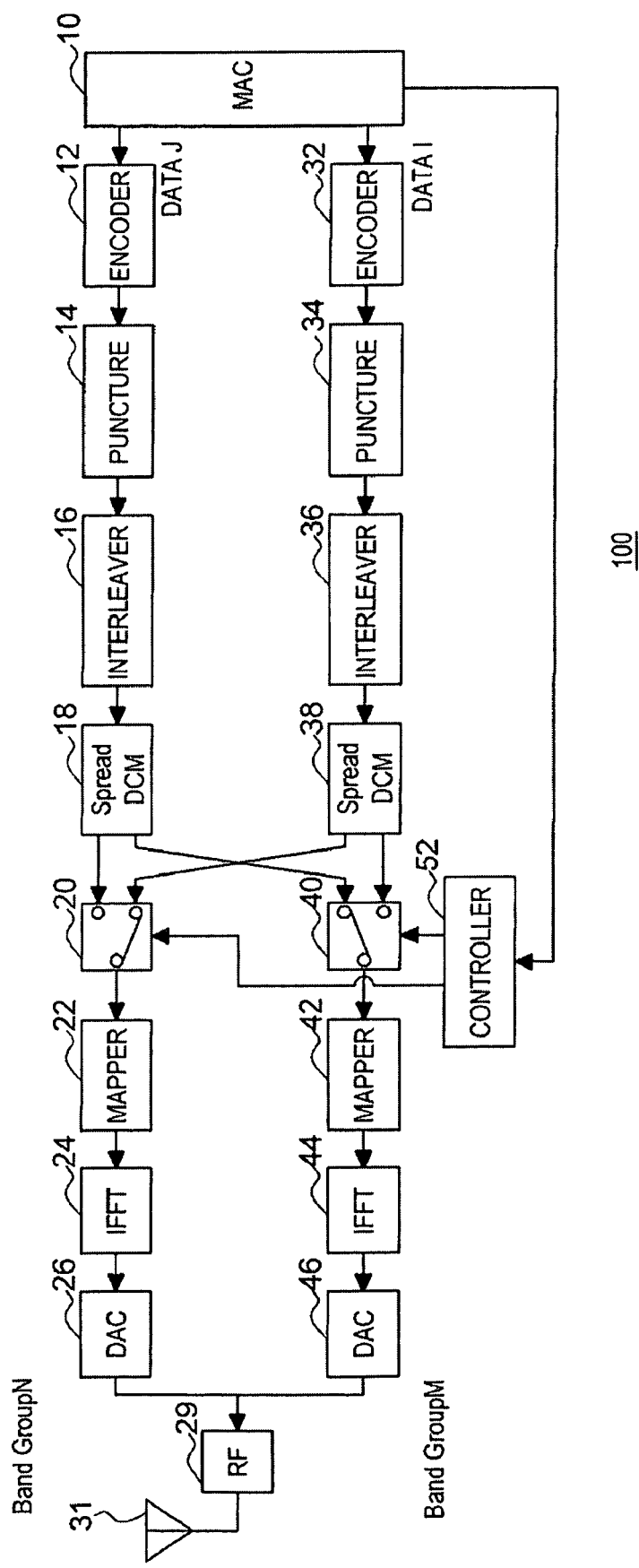
FIG. 10 is a schematic view showing an example of providing the antenna and an RF circuit commonly used in the band groups M and N.
Figure 11:
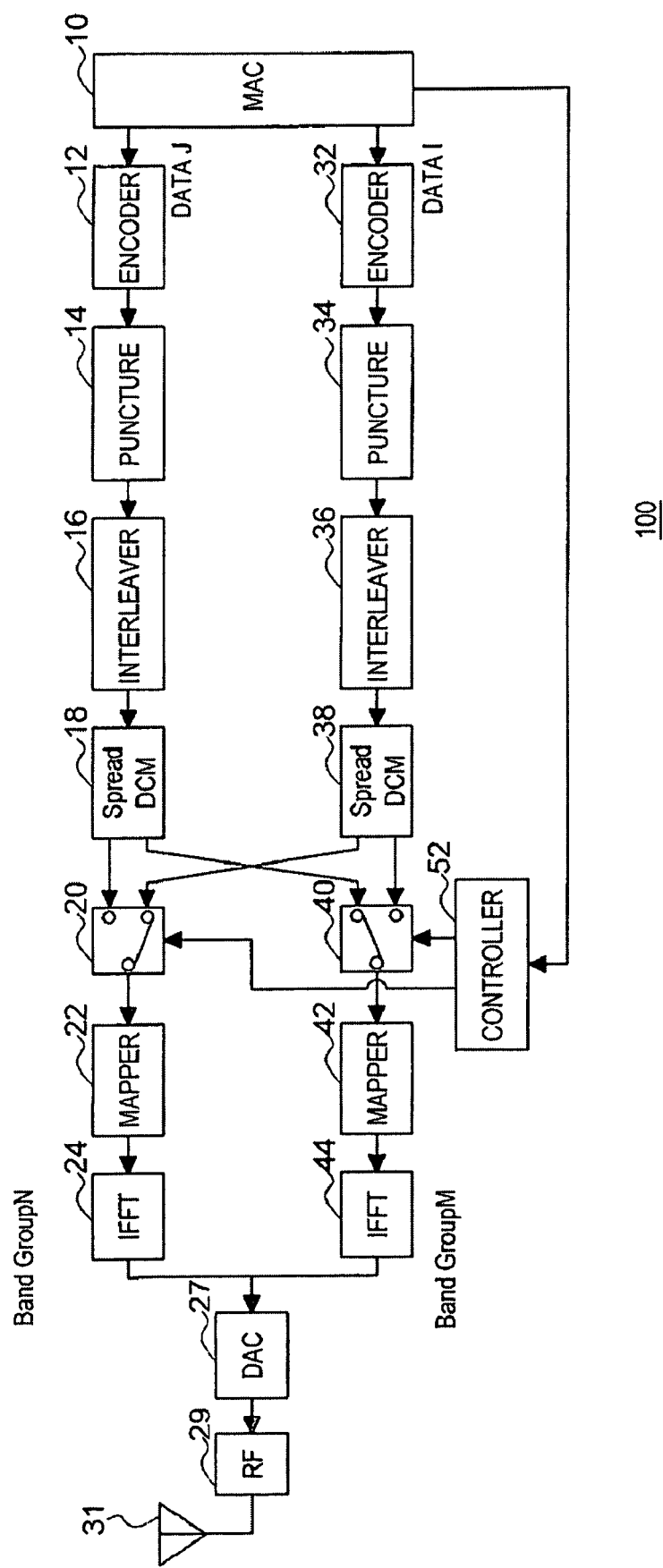
FIG. 11 is schematic view showing an example of providing the antenna, the RF circuit, and a DA converter commonly used in the band groups M and N.

Note that in the structure of FIG. 4, the antennas 30, 40, RF circuits 28, 48, DA converters 26, 46 of the transmission device 100 are separately configured between the band group M and the band group N. However, these constituent elements may be configured in common between the band groups M and N. FIG. 9 shows an example of providing an antenna 31 in common between the band groups M and N. Also, FIG. 10 shows an example of providing the antenna 31 and the RF circuit 29 in common between the band groups M and N. Further, FIG. 11 shows an example of providing the antenna 31, the RF circuit 29, and the DA converter 27 in common between the band groups M and N. Thus, in the device using a plurality of band groups, the device with a simple structure can be realized by constituting the antenna 31, the RF circuit 29, and the DA converter 27 in common.

Second Embodiment

Figure 12:
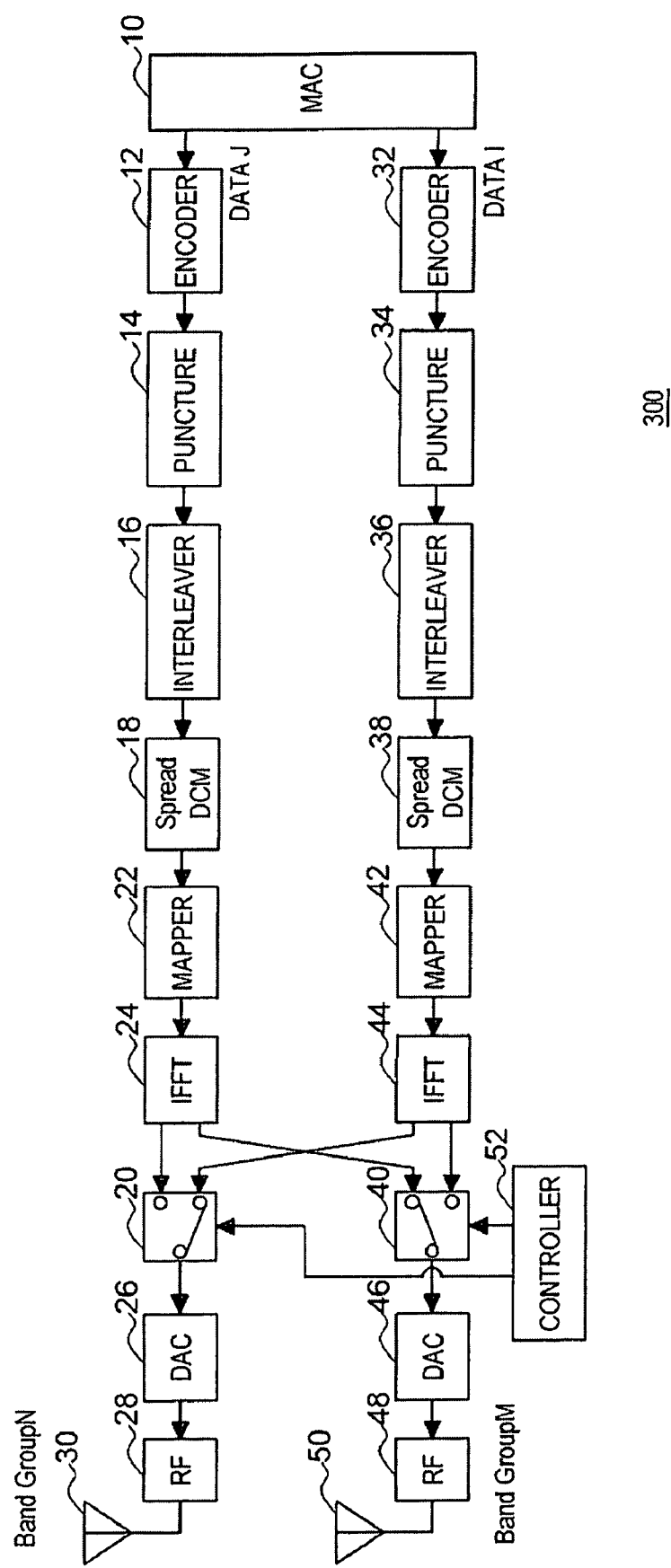
FIG. 12 is a schematic view showing the transmission device according to a second embodiment.

Next, a second embodiment of the present invention will be described. FIG. 12 is a schematic view showing a transmission device 300 according to the second embodiment. In the transmission device 300 shown in FIG. 12, positions into which the signal switching parts 20 and 40 are inserted, are different from those of the transmission device 100 of FIG. 4. In the transmission device 300 of FIG. 12, the signal switching part 20 is inserted between the IFFT 24 and the DA converter 26. Also, the signal switching part 46 is inserted between the IFFT 44 and the DA converter 46.

According to the second embodiment, switching of the signals by the signal switching parts 20 and 40 is performed to the signals subjected to inverse Fourier transform in the IFFTs 24 and 44. Therefore, the exchange of the signals is performed per every one symbol.

Figure 13:
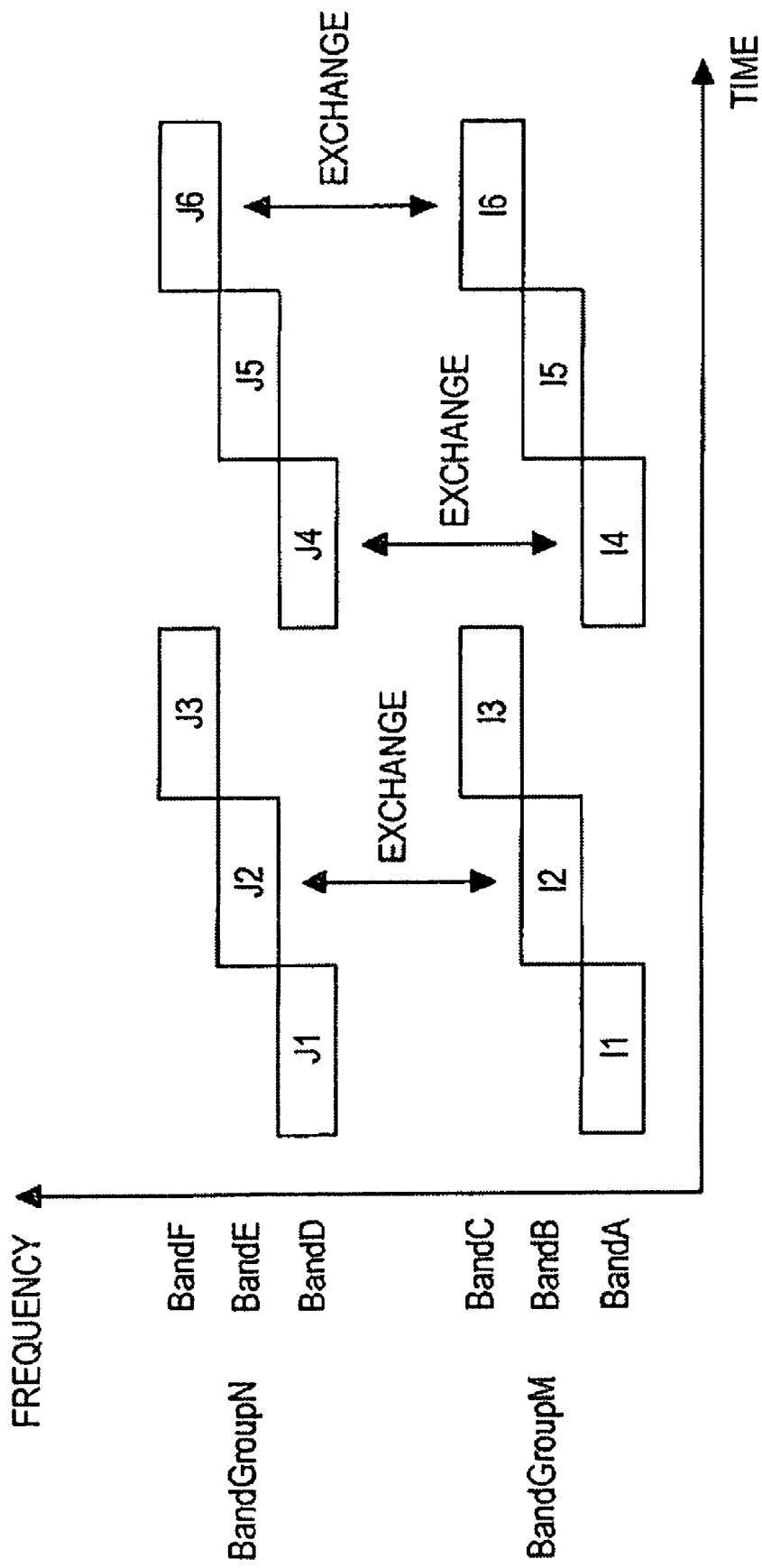
FIG. 13 is a schematic view showing a state in which the data of the band group M and the data of the band group N are exchanged in the second embodiment.

FIG. 13 is a schematic view showing a state in which the data of the band group M and the data of the band group N are exchanged. In the example of FIG. 13, the signal I2 of the band group M is exchanged with the signal J2 of the band group N. Also, the signal I4 of the band group M and the signal J4 of the band group N are exchanged, and the signal I6 of the band group N and the signal J6 of the band group M are exchanged. According to this embodiment, switching of the signals is performed by the signals switching parts 20 and 40, after the inverse Fourier transform is performed by the IFFTs 24 and 44. Therefore, exchange of the transmitted data is performed per every one symbol obtained by the spread along frequency axis.

In the second embodiment also, the data can be spread in the two band groups M and N, and therefore transmission/reception of the data resistant to fading can be performed. Moreover, according to the second embodiment, the exchange of the data is performed per every one symbol, and therefore the data can be spread over two band groups with a further simple structure.

Third Embodiment

Next, a third embodiment of the present invention will be described. The structure of the transmission device 100 according to the third embodiment is the same as the structure of the first embodiment described in FIG. 4. For example, a multiband OFDM system in which frequency hopping is performed defines that hopping is performed in a preamble transmission also, which is the transmission of signals for acquiring synchronization, for example like a communication system defined by IEEE802.15.3 standard, and further its hopping pattern and a data transmission pattern (called Time Frequency Code; TFC) have various types.

According to the first embodiment, the two band groups M and N are used to perform frequency hopping in each band group M and N. However, this hopping pattern is defined by TCP. In the hopping pattern of TCP5, TCP6, TCP7 defined by the IEEE802.15.3 standard, it is so defined that the communication is performed by one band in the band group without performing frequency hopping.

Figure 14:
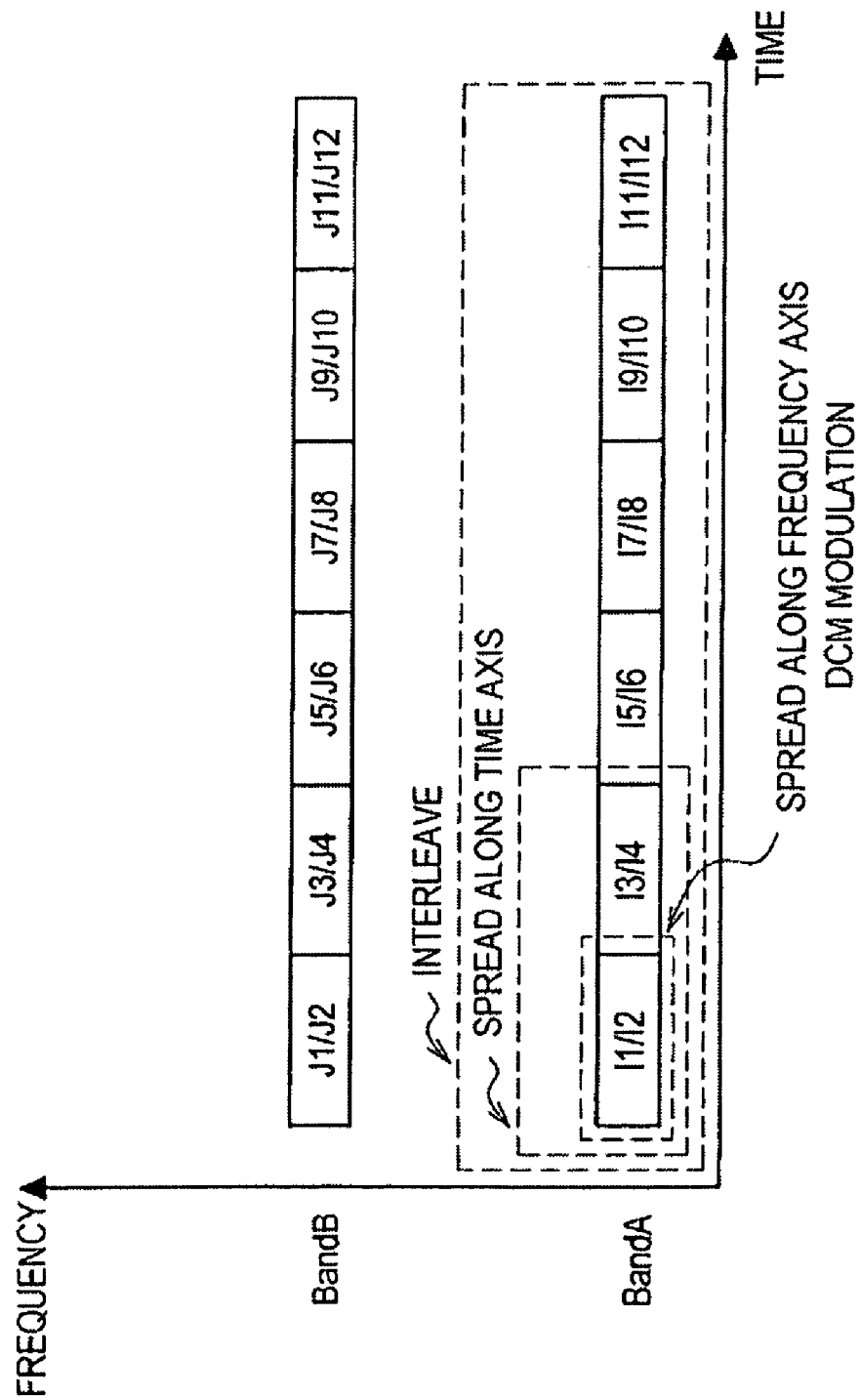
FIG. 14 is a schematic view showing a state in which the communication is performed by using two bands in one band group in a third embodiment.

According to the third embodiment, the communication is performed by using two bands in the same band group without performing hopping in the band group like the TCP5, TCP6, TCP7 defined by the IEEE802.15.3 standard. FIG. 14 is a schematic view showing a state in which the communication is performed by using two bands in one band group in the third embodiment. As shown in FIG. 14, according to the third embodiment, the communication is performed by using band A and band B in the band group M without performing frequency bopping. Thus, by not performing the frequency hopping, the communication can be performed by simultaneously using two bands in the same band group.

As shown in FIG. 14, when the data is not switched by the signal switching part, data I1 to I12 are sent by the band A, and data J1 to J12 are sent by the band B. In the same way as the first embodiment, the processing of interleave, spread along frequency axis, DCM modulation, and spread along time axis are applied to the data I and the data J transmitted by the band A and the band B.

Figure 15:
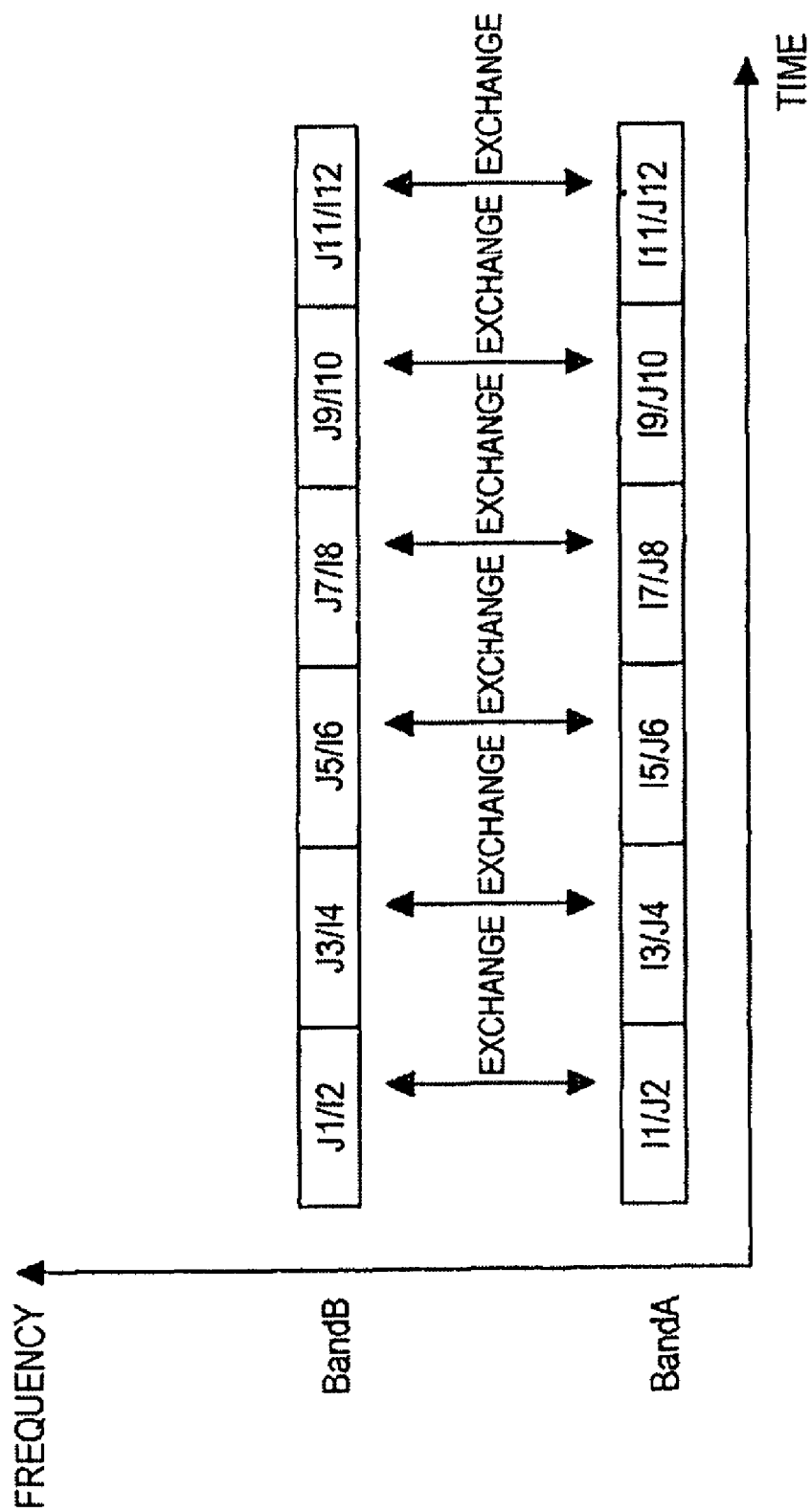
FIG. 15 is a schematic view showing a state in which the data is exchanged by a signal switching part.

FIG. 15 shows a state in which the data is exchanged by the signal switching parts 20 and 40. In the example of FIG. 15, in the same way as the example of FIG. 5, the data is exchanged per every symbol obtained by the spread along frequency axis, and I2 and J2, I4 and J4, I6 and J6, I8 and J8, I10 and J10, I12 and J12 are respectively exchanged per every ½ unit of one symbol.

Thus, even when the communication is performed by using two bands in the same band group, the resistance to fading can be improved by exchanging the data between two bands.

Figure 16:
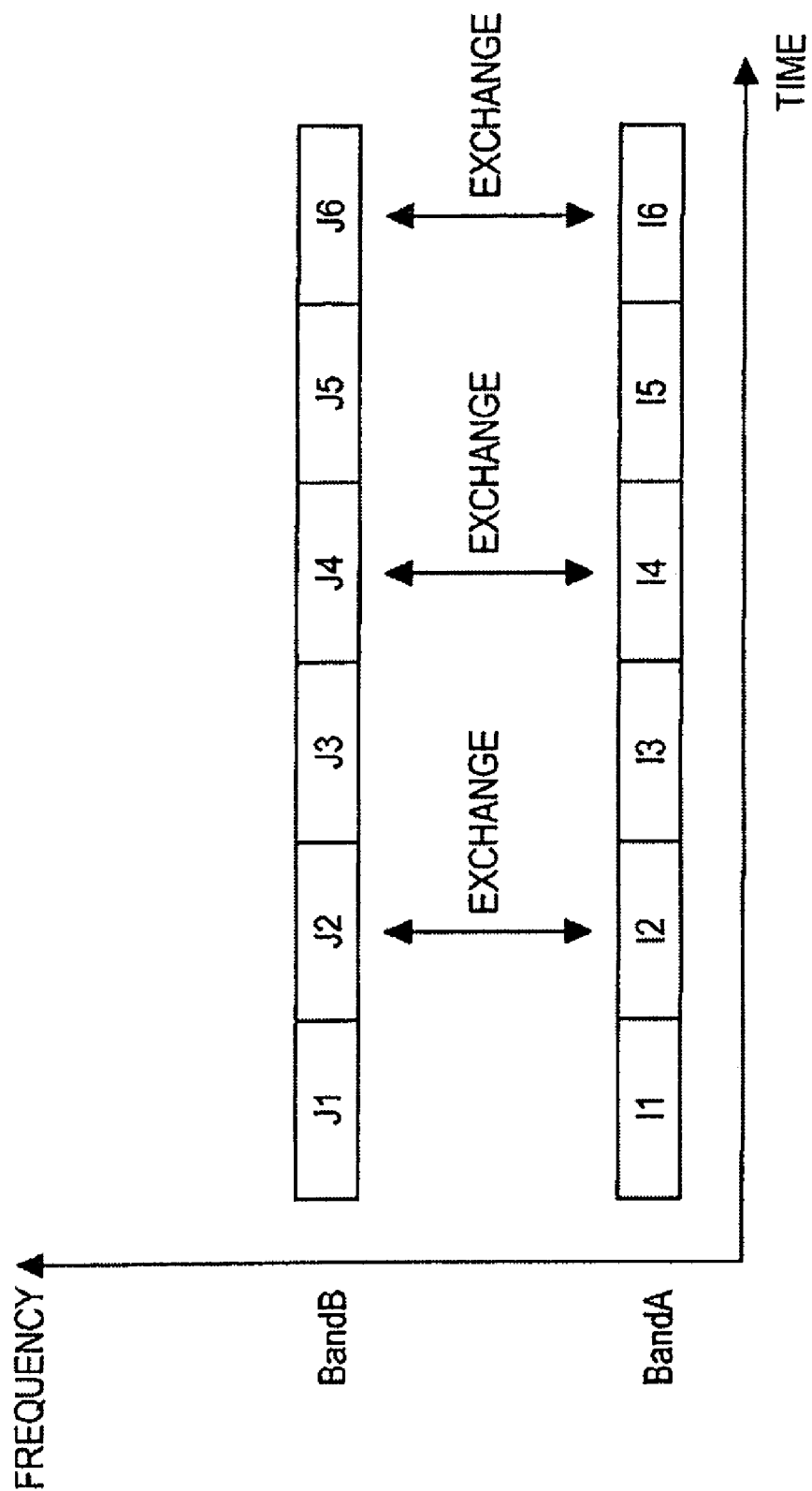
FIG. 16 is a schematic view showing an example of performing exchanging data between band A and band B in a third embodiment, with the configuration of FIG. 12 of the second embodiment.

FIG. 16 is a schematic view showing an example of performing exchange of the data between the band A and the band B with a structure of FIG. 12 described in the second embodiment. In this case, in the same way as FIG. 13, data exchange is performed per every symbol of one unit to the data after being subjected to inverse Fourier transform.

According to the third embodiment, the communication can be performed by using two bands in the same band group without performing frequency hopping. Therefore, the communication can be performed by using two bands of close frequency bands. Accordingly, a device structure can be made simple, and the simple structure of the device is possible when the constituent elements are made in common between two frequency bands as shown in specifically FIG. 9 to FIG. 11.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device, comprising:
   a first data generation part that generates first data for transmission in a first frequency band;
   a second data generation part that generates second data for transmission in a second frequency band;
   a data exchange part that exchanges a part of the first data and a part of the second data so that the part of the first data is for transmission in the second frequency band and the part of the second data is for transmission in the first frequency band;
   a controlling part that acquires count values of the first and second data, wherein the controlling part controls exchange of data by the data exchange part based on the count values of the first and second data; and
   a transmission part that transmits the first and second data after the data exchange is performed by the data exchange part so that parts of the first data and the second data are transmitted in each one of the first and second frequency bands.

2. The transmission device according to claim 1, wherein the data exchange part exchanges the first and second data subjected to processing of spread along frequency axis, spread along time axis, or DCM modulation per every ½ symbol.

3. The transmission device according to claim 1, wherein the transmission part includes:
   a DA converter that DA-converts the data after data exchange is performed by the data exchange part;
   an RF circuit that amplifies a signal converted by the DA converter; and
   a transmission antenna that transmits the signal output from the RF circuit,
   wherein both of the first and second data are processed by at least one of the DA converter, the RF circuit, and the transmission antenna.

4. The transmission device according to claim 1, wherein the first and second data are transmitted without performing frequency hopping in each one of the first frequency band and the second frequency band.

5. A reception device, comprising:
   a first reception part that receives a first transmission signal transmitted in a first frequency band;
   a second reception part that receives a second transmission signal transmitted in a second frequency band with a part of data mutually spread between the first transmission signal and the second transmission signal;
   a data exchange part that exchanges a part of the first transmission signal and a part of the second transmission signal; and
   a controlling part that acquires count values of the part of the first transmission signal and the part of the second transmission signal, wherein the controlling part controls exchange of data by the data exchange part based on the count values of the part of the first transmission signal and the part of the second transmission signal.

6. A communication system in which a transmission device and a reception device are connected via a wireless communication network,
   wherein the transmission device comprises:
   a first data generation part that generates first data for transmission in a first frequency band;
   a second data generation part that generates second data for transmission in a second frequency band;
   a transmission side data exchange part that exchanges a part of the first data and a part of the second data so that the part of the first data is for transmission in the second frequency band and the part of the second data is for transmission in the first frequency band;
   a transmission side controlling part that acquires count values of the first and second data, wherein the transmission side controlling part controls exchange of data by the transmission side data exchange part based on the count values of the first and second data; and
   a transmission part that transmits the first and second data after the data exchange is performed by the data exchange part so that parts of the first data and the second data are transmitted in each one of the first and second frequency bands, and
   wherein the reception device includes:
   a first reception part that receives a first transmission signal transmitted in the first frequency band including the part of the second data;

a second reception part that receives a second transmission signal transmitted in the second frequency band including the part of the first data;

a reception side data exchange part that exchanges the part of the first data in the second transmission signal and the part of the second data in the first transmission signal; and a reception side controlling part that acquires count values of the first and second data, wherein the reception side controlling part controls exchange of data by the reception side data exchange part based on the count values of the first and second data.

7. A transmission method, comprising the steps of:

generating first data for transmission in a first frequency band;

generating second data for transmission in a second frequency band;

acquiring count values of the first and second data;

exchanging a part of the first data and a part of the second data so that the part of the first data is for transmission in the second frequency band and the part of the second data is for transmission in the first frequency band, wherein the exchanging is controlled based on the count values of the first and second data; and transmitting the first and second data after the data exchange is performed so that parts of the first data and the second data are transmitted in each one of the first and second frequency bands.

8. A non-transitory computer-readable medium storing instructions that, when executed by a computer, cause the computer to:

generate first data for transmission in a first frequency band;

generate second data for transmission in a second frequency band;

acquire count values of the first and second data;

exchange a part of the first data and a part of the second data so that the part of the first data is for transmission in the second frequency band and the part of the second data is for transmission in the first frequency band, wherein the exchange is controlled based on the count values of the first and second data; and transmit the first and second data after the data exchange is performed by the data exchange section so that portions of the first data and the second data are transmitted in each one of the first and second frequency bands.

* * * * *